Feb. 27, 1945. S. B. MARTIN 2,370,368
PUSHER
Filed Aug. 11, 1941
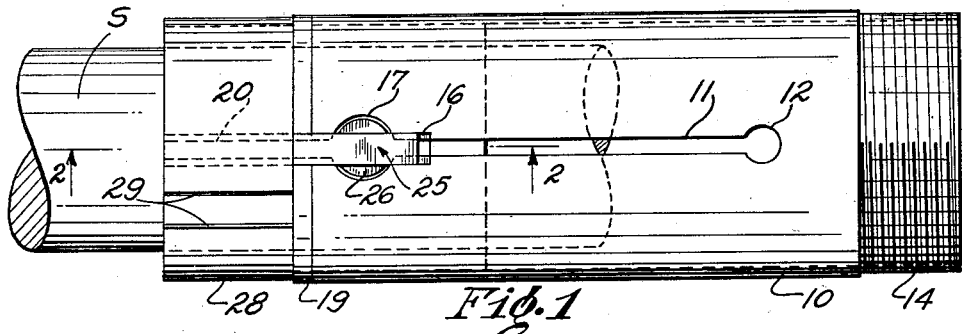
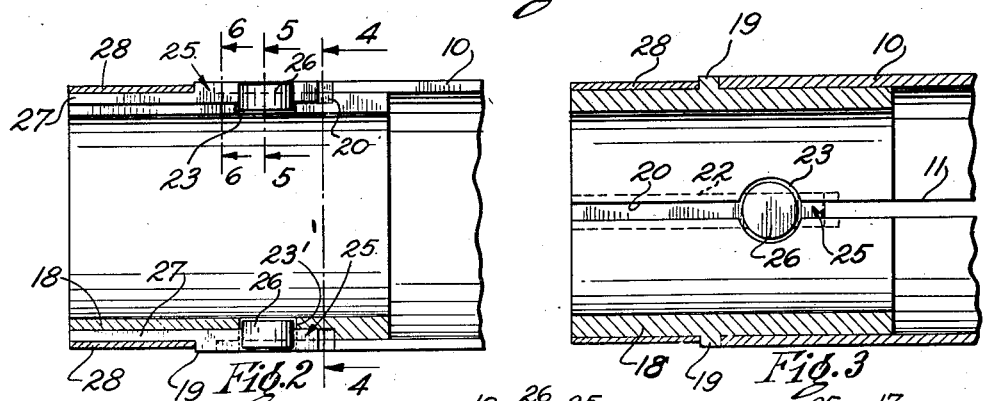
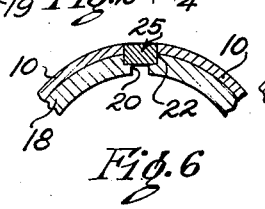
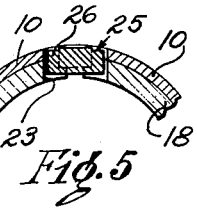
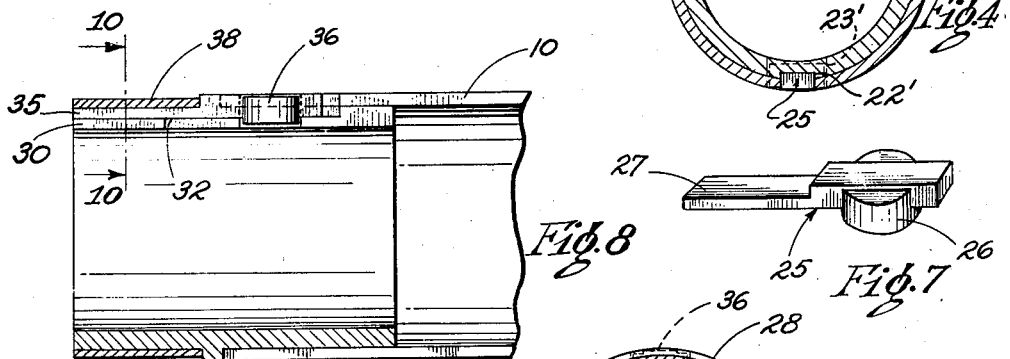
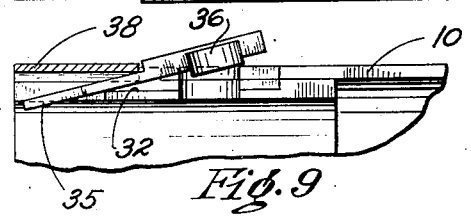
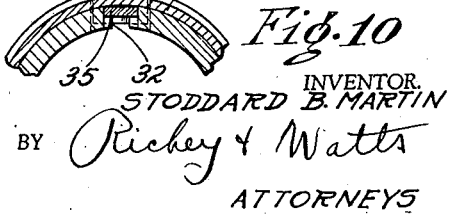
INVENTOR.
STODDARD B. MARTIN
BY Richey & Watts
ATTORNEYS Patented Feb. 27, 1945

2,370,368

UNITED STATES PATENT OFFICE 2,370,368

PUSHER

Stoddard B. Martin, Lakewood, Ohio

Application August 11, 1941, Serial No. 406,268

13 Claims. (Cl. 29—62)

This invention relates to improvements in stock feed fingers or pushers of the type employed in automatic screw machines.

Each spindle of an automatic screw machine ordinarily includes a rotating collet tube having a collet at its forward end which is arranged to be compressed radially to grip and rotate a bar of stock fed axially through the tube. At the end of each cycle of operation the projecting end of stock is cut off from the bar, whereupon the collet opens and a new length of stock is fed forwardly and the collet is again closed to grip the stock and repeat the cycle of operation. The stock is ordinarily fed forward by a pusher carried by a reciprocating pusher tube arranged between and coaxial with the collet tube and bar of stock.

In the conventional machine the pusher is simply a spring bushing exerting a constant grip on the bar stock which is moved forwardly after the collet opens until the forward end of the bar strikes a stock gauge. The collet then grips the bar and the pusher is retracted. One of the disadvantages of this arrangement is that when the pusher is given a sufficiently tight grip on the bar to insure accurate feeding and prevent rebounding when the bar strikes the gauge, there is danger of scratching or scoring the stock when the pusher is retracted. Another disadvantage of such an arrangement is that the pusher exerts a constant grip on the bar stock during both the feeding and return strokes so that the gripping surfaces of the pusher are rapidly worn out by the friction of the return strokes.

To avoid these disadvantages it has been proposed to provide one way grippers which by a wedging or similar action grip the bar tightly on the forward feeding stroke and release it, or grip it but lightly, on the return stroke. Pushers of this type are disclosed in my prior Patents Nos. 2,088,067, 2,169,107, 2,187,089 and 2,187,090, and in my co-pending applications Serial No. 387,476, filed April 8, 1941, now Patent No. 2,323,067, issued June 29, 1943, and Serial No. 390,601, filed April 26, 1941.

It has also been proposed to construct such pushers as master pushers. The gripping surfaces that engage the stock are provided with a bushing removable from the pusher shell, so that a bushing with the desired sized opening may be positioned in the shell of the pusher to accommodate any particular size of stock without substituting an entire pusher or feeding finger as has been customary in conventional machines. Such master pushers are of but limited utility unless the construction is sufficiently compact and simple to permit the same to be used to feed stock of the maximum capacity of the machine, in addition to smaller sizes of stock.

One of the difficulties heretofore encountered in connection with master pushers having a one-way gripping action arises from the fact that it is occasionally necessary to withdraw the bar being worked upon from the machine. In pushers in which the gripping action is increased by wedging means and the like on the feeding stroke, it is necessary to provide means to prevent the wedging or tight gripping action when the bar is withdrawn. The provision of such means in addition to the wedging means not only increases the cost, and complexity of the device, but adds to the difficulty of maintaining it sufficiently compact to permit the same pusher to handle all sizes of stock up to and including the maximum capacity of the machine.

The principal object of this invention is to obtain a one-way gripping action in a pusher by providing a constant gripping force active on the feeding stroke, and automatically relieving or releasing the force on the retracting stroke.

Other objects are to arrange the parts of the pusher so that it is capable of handling bar stock of a diameter up to and including the maximum capacity of the machine; to eliminate the necessity of holding the grip varying means out of operation when a bar is withdrawn from the machine; to incorporate a wedging and abutment means between the shell and bushing within the wall thickness of the shell and bushing; to arrange an abutment means for transmitting the retracting movement of the shell to the bushing as a wedging means to expand the bushing or shell, or both, to relieve or release the grip on the stock during the retracting stroke; to arrange said abutment and wedging means so that it is readily accessible to facilitate the removal of the bushing from the shell; and generally to simplify, reduce the cost and improve the efficiency of pushers of this type.

In the accompanying drawing which illustrates preferred embodiments of the invention:

Fig. 1 is a side elevation of a complete pusher embodying the present invention;

Fig. 2 is a longitudinal section of a portion of the improved pusher, the view being taken on a plane indicated by line 2—2 of Fig. 1;

Fig. 3 is a longitudinal section corresponding to Fig. 2, but taken on a plane perpendicular to the plane indicated by the line 2—2 of Fig. 1;

Fig. 4 is a cross section of the shell and bushing taken on a plane indicated by the line 4—4, Fig. 2;

Fig. 5 is a cross section of a fragmentary portion of the shell and bushing with the locking key positioned therein, the view being taken on a plane indicated by line 5—5 of Fig. 2;

Fig. 6 is a similar cross section of a fragmentary portion of the shell and bushing taken on line 6—6 of Fig. 2;

Fig. 7 is a perspective view of a locking key;

Fig. 8 is a longitudinal section of a slightly modified shell and bushing showing the locking key positioned therein;

Fig. 9 is a longitudinal section of a fragmentary portion of the shell and bushing of Fig. 8 showing the locking key partially removed therefrom; and Fig. 10 is a cross section of a fragmentary portion of the shell and bushing taken on line 10—10 of Fig. 8.

Referring to the drawing, the pusher of the present invention embodies generally a pusher shell or the like in which may be secured a bushing of any desired size of internal opening and arranged to resiliently grip the bar of stock.

As shown in Figs. 1 through 7, the improved pusher comprises a shell 10 formed with longitudinal slots 11 extending inwardly from the forward end of the shell and terminating in apertures 12. The shell 10 may be formed integrally with the pusher tube, not shown, or the inner end 14 of the shell may be threaded for engagement with the pusher tube. The shell 10 is preferably slotted and the segments so formed are bent inwardly prior to the hardening thereof so that the shell will exert a spring pressure upon a bushing engaging the stock.

Near the forward end of the shell, the slots 11 are widened to define key ways 16 for the reception of suitable locking keys. The shell 10 is provided, intermediate the ends of the key ways 16, with openings 17 having a diameter greater than the width of the key ways.

A bushing 18, Fig. 3, is positioned within the outer end portion of the shell 10 and is provided with an external annular shoulder 19, intermediate its ends, for engaging the front edge of the shell to limit the movement of the bushing rearwardly into the shell. The bushing 18 is rendered resiliently expansible by a slot 20 extending throughout its length. The bushing is arranged to be assembled in the shell with the slot 20 registering with one of the slots 11 in the shell.

The portions of the bushing 18 defining the edges of the slot 20 are provided with an external longitudinal recess 22 extending inwardly from the forward end of the bushing to a point in alinement with the inner ends of the key ways 16 formed in the shell 10 and having a width equal to that of the key ways 16. The bushing 18 is formed with an opening 23 intersecting the slot 20 and adapted to register with one of the openings 17 in the shell. Preferably, the bushing is also formed on the opposite side with a recess 22' which does not cut completely through the bushing wall and an opening 23', which registers with another slot 11 and opening 17 in the shell.

Locking keys 25, Fig. 7, are arranged to fit within the key ways 16 in the shell and recesses 22 and 22' in the bushing, and are provided with wedge plugs 26. Each key 25 is formed with a reduced end portion 27 of a length equal to the length of the bushing from its forward end to the flange 19, and sufficiently thin to seat within the recess 22 or 22' with its outer face substantially flush with the outer surface of the forward portion of the bushing. The remainder of the length of each key 25 is of sufficient thickness to seat in the recess 22 or 22' with its outer surface substantially flush with the outer surface of the shell 10. The wedge plugs 26 have a height substantially equal to the combined thickness of the walls of the shell 10 and bushing 18, and are arranged to extend through the openings 17 in the shell and the alined openings 23 and 23' in the bushing. The diameter of the plugs 26 is less than the diameter of the openings in the shell and bushing, and the inner ends of the keys 25 are spaced a short distance from the inner ends of the key ways 16 so as to permit the keys and plugs to have a slight longitudinal movement independent of the shell and bushing.

A spring collar or band 28 encircles the outer end of the bushing 18 and overlies the reduced ends 27 of the keys 25 so as to retain the keys in the shell and bushing. The spring has its free ends 29 spaced apart a sufficient distance to permit it to be turned to release the keys.

In the use of the improved pusher, arranged as shown in Fig. 1, the spring tension of the shell, bushing, and spring 28 combine to give the bushing a secure grip upon the stock S. Upon the forward movement of the pusher tube, which carries the shell 10, the forward edge of the shell engages the shoulder 19 and moves the bushing and stock through the collet or to the left as seen in Fig. 1. Upon the rearward movement or return stroke of the pusher tube, the forward edges of the openings 17 in the shell engage the plugs 26 and move the plugs against the rear edges of the openings 23 and 23' in the bushing, thus transmitting the rearward movement of the shell to the bushing through the plugs 26.

The frictional resistance of the bushing to rearward sliding movement over the stock, which has now been gripped by the collet, reacts through the plugs 26 and the edges of the openings engaging the plugs. The forward edges of the openings 17 in the shell, which merge into the slots 11, act as wedging surfaces against the arcuate surface of the plugs 26, tending to spread the slots 11 and relieve the gripping pressure exerted by the shell on the bushing. Similarly, the rear edges of the opening 22, which merge into the slot 20 in the bushing, act as wedging surfaces on one of the plugs 26 tending to open the slot 20 and relieve the gripping pressure of the bushing on the stock.

The forces available to spread the shell and bushing are components of the forces applied to the wedge plugs 26, so that equilibrium is reached when the spreading component of the resistance of the bushing to sliding movement on the stock equals the spring forces exerted by the shell and bushing tending to collapse the slots 11 and 20. These components may be varied by varying the shape of the wedge plugs 26 and the openings 17 and 23 so that the friction of the bushing on the stock during the retracting stroke of the pusher may be reduced to any desired fraction of the friction on the advancing or feeding stroke. As illustrated, the plugs and openings are substantialy circular for convenience in manufacture, and the wedging angle is determined by the angle made by the tangents of the openings at their points of intersection with the opposite edges of the slots. Increased spreading forces may be obtained with circular plugs and openings by widening the slots, and further increase may be obtained by changing the plugs and openings to diamond or oval shape.

Although I have disclosed two oppositely disposed keys 25 and wedge plugs 26, both acting to spread the slots 11 in the shell and one acting to spread the slot 20 in the bushing, it will be understood that only the one key and plug acting in the slots in both the bushing and shell may be used if desired. Similarly the number and location of the slots and the number of wedge plugs cooperating therewith may be varied as desired.

Thus the pusher normally exerts a constant spring grip on the stock which remains unchanged during the feeding stroke but which is reduced to any desired degree on the retracting stroke to avoid scoring or marring of the stock and excessive wear on the engaging surfaces of the bushing. When it is necessary to remove a bar from the machine it can be withdrawn by a straight pull or by slamming the bar and pusher tube rearwardly until the pusher tube strikes the spider, or other abutment, causing the bar to slide through the bushing by momentum.

The bushing 18, illustrated herein, closes upon the stock by its own resilience and is further urged toward the stock by the segments of the shell 10 and the spring collar 28. The spring 28 may be selected to balance the force exerted by the split shell, or when so desired may supply additional pressure at the forward end of the bushing to insure a good grip of the stock by the bushing. However, the spring 28 may be employed merely as a retaining ring for the key 25. When the stock is removed from the bushing the key retains the bushing and shell in their proper assembled relation for the reception of another piece of stock.

In the modified form of the improved pusher shown in Figs. 8 to 10, inclusive, the several parts thereof are formed in the same manner as disclosed in Figs. 1 to 6, inclusive, with the exception of the portion of the longitudinal recess provided in the outer end of the bushing. As shown in Figs. 8 and 9, the outer portion of the longitudinal recess 32 terminates midway in the outer end of the bushing and the outer end of the longitudinal slot 30 in the bushing is enlarged to a width equal to that of the locking key 35.

With such an arrangement the bushing and locking key 35 may be removed from the shell by simply inserting a suitable tool, such as a screw driver, between the spring collar 38 and locking key 35 and then moving the key as shown in Fig. 9. The key may be pried up a sufficient distance to permit the plug 36 to clear the opening in the shell, and the bushing and key may then be removed as a unit from the shell, without removing the key from its seat in the bushing.

It will be understood that the number and arrangement of the locking keys and the number and arrangement of the slots which render the bushing and shell resilient may be varied if desired and likewise that the shape of the wedging elements can be varied to reduce the gripping pressure on the return stroke in any desired manner. Many other modifications and variations may be resorted to without departing from the scope of the invention as defined in the following claims.

I claim:

1. A pusher for feeding stock comprising a split shell, a collapsible bushing within the shell surrounding the stock to be fed, said shell being arranged to resiliently contract upon the bushing, means for transmitting movement of the shell in one direction to the bushing to feed stock, said means being arranged to apply no component of the feeding force to expand said shell, wedging means to transmit movement of the shell in the other direction to the bushing, said wedging means engaging the shell in such a manner as to apply a component of the force to expand said shell and reduce the grip of the shell upon the bushing.

2. A pusher for feeding stock comprising a shell, a collapsible bushing within the shell, said shell resiliently gripping said bushing to collapse the same upon the stock to be fed, interengaging means on said bushing and shell to transmit axial movement of said shell to said bushing, said means being constructed and arranged to automatically reduce the grip of said shell on said bushing during axial movement in one direction, and to maintain the grip of said shell on said bushing undiminished during axial movement in the other direction.

3. A pusher for feeding stock comprising a shell, a bushing within the shell surrounding the stock to be fed, said bushing being arranged to resiliently contract upon and grip the stock, said shell being arranged to resiliently contract upon the bushing to increase the grip of the bushing upon the stock, interengaging means on the shell and bushing for transmitting axial movement of the shell to the bushing, said interengaging means being constructed and arranged to automatically reduce the contracting force of both the shell on the bushing and the bushing on the stock during movement in one direction, said engaging means acting to maintain the contracting force of said shell and said bushing undiminished during axial movement in the other direction.

4. A pusher comprising a shell, a bushing therein for resiliently engaging the stock to be fed, said bushing having an end portion projecting from said shell with an abutment thereon engaging the end of the shell to transmit axial movement of the shell in one direction to the bushing without diminishing the grip of the bushing on the stock, and means in said shell and bushing for expanding said bushing upon axial movement of the shell in the other direction.

5. A pusher comprising a shell, a bushing therein for resiliently engaging the stock to be fed, said bushing having an end portion projecting from said shell with an abutment thereon engaging the end of the shell to transmit axial movement of the shell in one direction to the bushing without diminishing the grip of the bushing on the stock, wedging means positioned in said shell and bushing and arranged to expand said shell and bushing upon axial movement of the shell in the other direction, and a spring collar on said end portion of the bushing for locking said wedging means in said shell and bushing.

6. In a pusher for automatic screw machines and the like, a resiliently expansible pusher shell, an expansible bushing disposed within the shell resiliently gripping the stock to be fed, said shell compressing said bushing upon the stock, said shell and bushing having aligned openings therein, a wedge plug loosely mounted in said openings, said wedge plug expanding the bushing and shell upon axial movement of the shell in one direction to partially release the grip of the bushing upon the stock.

7. In a pusher for automatic screw machines and the like, a pusher shell having longitudinal slots formed in one end to define spring segments, a split bushing positioned in the shell with the split therein registering with one of the slots in said shell, said bushing surrounding the stock to be fed and resiliently urged into engagement therewith by the segments of the shell, a portion of the bushing projecting from the slotted end of the shell and having an axially extending key way therein, a key disposed in said way and in one of the slots in the shell, said key arranged to expand said bushing and segments to partially release the grip on the stock upon axial movement of the shell in one direction.

8. A pusher comprising a shell having longitudinal slots in one end defining resiliently expansible segments, a bushing having a slot extending throughout its length partially disposed in said segments for resiliently gripping the stock to be fed, said bushing having the slot therein alined with one of the slots in said shell, an external annular abutment on said bushing engaging the end of the shell and preventing axial movement of the shell in one direction relative to the bushing, said bushing and shell having their alined slots configured for the reception of a key to prevent axial movement of the shell in the other direction with respect to the bushing, said key being arranged to expand said shell and bushing to partially release the grip on the stock during the axial movement in said other direction.

9. A pusher comprising a shell having diametrically disposed longitudinal slots in one end defining resilient expansible segments, a bushing having a slot extending throughout its length partially disposed in said segments for resiliently gripping the stock to be fed, said bushing having the slot therein alined with one of the slots in said shell, an external annular abutment on said bushing engaging the end of the shell and preventing axial movement of the shell in one direction relative to the bushing, said bushing and shell having their alined slots configured for the reception of a key to prevent axial movement of the shell in the other direction with respect to the bushing and a spring collar surrounding the free end of said bushing and engageable with said key for retaining said key in said coacting slots.

10. A pusher comprising a shell, a bushing partially within the shell and surrounding the stock to be fed, said shell having an aperture therein with opposed longitudinal slots extending therefrom, said bushing provided with an aperture having opposed longitudinal slots extending therefrom and arranged to register with the aperture in said shell, a key disposed within said slots and having a plug thereon positioned within said aperture to prevent axial movement of the shell with respect to the bushing.

11. A pusher comprising a shell, a bushing partially within the shell and surrounding the stock to be fed, said shell having an aperture therein with opposed longitudinal slots extending therefrom, said bushing provided with an aperture having opposed longitudinal slots extending therefrom and arranged to register with the aperture in said shell, a key, a plug formed thereon, said plug positioned within said aperture with the key in said slots to expand said bushing upon the retraction of said shell.

12. A pusher for feeding stock comprising a resilient bushing surrounding and gripping the stock to be fed, a shell surrounding and resiliently gripping the bushing and having means for moving said bushing in one direction to feed stock, and means engaging said bushing intermediate its ends for moving said bushing in the opposite direction, said last-mentioned means being arranged to apply a component of its force to expand the leading end of said bushing.

13. A pusher for feeding stock comprising a resilient bushing surrounding and gripping the stock to be fed, a shell surrounding and resiliently gripping the bushing and having means for moving said bushing in one direction to feed stock under the full gripping force of said bushing and said shell and means engaging said bushing intermediate its ends for moving said bushing in the opposite direction, said last-mentioned means being arranged to apply a component of its force to expand the leading end of said bushing.

STODDARD B. MARTIN.